US008825675B2

(12) United States Patent
Wester

(10) Patent No.: US 8,825,675 B2
(45) Date of Patent: Sep. 2, 2014

(54) SYSTEMS AND METHODS FOR REPRESENTING TEXT

(75) Inventor: Joachim Wester, Stockholm (SE)

(73) Assignee: Starcounter AB, Stockholm (SE)

( * ) Notice: Subject to any disclaimer, the term of this patent is extended or adjusted under 35 U.S.C. 154(b) by 494 days.

(21) Appl. No.: 12/718,347

(22) Filed: Mar. 5, 2010

(65) Prior Publication Data

US 2011/0219014 A1      Sep. 8, 2011

(51) Int. Cl.
*H03M 7/00* (2006.01)
*G06F 7/00* (2006.01)
*G06F 17/30* (2006.01)
*G06F 15/16* (2006.01)

(52) U.S. Cl.
CPC .............. *G06F 17/30* (2013.01); *Y10S 707/917* (2013.01)
USPC ............................... 707/752; 707/917; 341/81

(58) Field of Classification Search
USPC ...................................... 341/81; 707/752, 917
See application file for complete search history.

(56) References Cited

U.S. PATENT DOCUMENTS

| | | | | | |
|---|---|---|---|---|---|
| 5,225,833 | A | * | 7/1993 | Fisher et al. | 341/90 |
| 5,675,818 | A | * | 10/1997 | Kennedy | 707/7 |
| 5,703,907 | A | * | 12/1997 | James | 341/106 |
| 5,852,469 | A | * | 12/1998 | Nagai et al. | 341/82 |
| 6,189,006 | B1 | * | 2/2001 | Fukushima | 707/6 |
| 2003/0233340 | A1 | * | 12/2003 | Flasza et al. | 707/1 |
| 2004/0006569 | A1 | * | 1/2004 | Carlin et al. | 707/101 |

FOREIGN PATENT DOCUMENTS

EP      0 294 950      12/1988

OTHER PUBLICATIONS

Huffman, D. et al., A Method for the Construction of Minimum-Redundancy Codes, Proceedings of the I.R.E., vol. 39, No. 9, pp. 1098-1101, 1952.
Special Character Sort Sequence, IBM Technical Disclosure Bulletin, International Business Machines Corp., vol. 32, No. 1, pp. 5-6, 1989.
Patent Cooperation Treaty, International Search Report, International Application No. PCT/EP2010/052870, mailed Oct. 6, 2010.
Patent Cooperation Treaty, Transmittal of International Preliminary Report on Patentability, International Application No. PCT/EP2010/052870, mailed Sep. 20, 2012.
Yergeau, F., UTF-8, a transformation format of ISO 10646, Alis Technologies, Standards Track, pp. 1-16, Nov. 2003, XP015009411.
European Patent Office, Communication Pursuant to Article 94(3) EPC, Applcation No. 10 709 191.0, mailed Jul. 10, 2013.

* cited by examiner

*Primary Examiner* — Greta Robinson
*Assistant Examiner* — Brian E. Weinrich
(74) *Attorney, Agent, or Firm* — Kilpatrick Townsend Stockton LLP

(57) ABSTRACT

The disclosure herein describes systems and methods for representing text. For example, one disclosed embodiment is a method including the steps of receiving a plurality of text strings, each text string comprising at least one character, wherein the at least one character has a representation comprising a first part and a second part; receiving a request to sort the plurality of text strings; and sorting the plurality of text strings based on first parts of the characters of the text strings. In another embodiment, a computer-readable medium comprises program code for causing a processor to execute such a method.

38 Claims, 7 Drawing Sheets

| Character | Code | Character | Code | Character | Code | Character | Code |
|---|---|---|---|---|---|---|---|
| A | 0 | O | 14 | c | 28 | q | 42 |
| B | 1 | P | 15 | d | 29 | r | 43 |
| C | 2 | Q | 16 | e | 30 | s | 44 |
| D | 3 | R | 17 | f | 31 | t | 45 |
| E | 4 | S | 18 | g | 32 | u | 46 |
| F | 5 | T | 19 | h | 33 | v | 47 |
| G | 6 | U | 20 | i | 34 | w | 48 |
| H | 7 | V | 21 | j | 35 | x | 49 |
| I | 8 | W | 22 | k | 36 | y | 50 |
| J | 9 | X | 23 | l | 37 | z | 51 |
| K | 10 | Y | 24 | m | 38 | _ | 52 |
| L | 11 | Z | 25 | n | 39 | | |
| M | 12 | a | 26 | o | 40 | | |
| N | 13 | b | 27 | p | 41 | | |

Fig. 1 (Prior Art)

| Character | Code | Character | Code | Character | Code | Character | Code |
|---|---|---|---|---|---|---|---|
| a | 0@0 | h | 0@7 | o | 0@14 | v | 0@21 |
| A | 1@0 | H | 1@7 | O | 1@14 | V | 1@21 |
| b | 0@1 | i | 0@8 | p | 0@15 | w | 0@22 |
| B | 1@1 | I | 1@8 | P | 1@15 | W | 1@22 |
| c | 0@2 | j | 0@9 | q | 0@16 | x | 0@23 |
| C | 1@2 | J | 1@9 | Q | 1@16 | X | 1@23 |
| d | 0@3 | k | 0@10 | r | 0@17 | y | 0@24 |
| D | 1@3 | K | 1@10 | R | 1@17 | Y | 1@24 |
| e | 0@4 | l | 0@11 | s | 0@18 | z | 0@25 |
| E | 1@4 | L | 1@11 | S | 1@18 | Z | 1@25 |
| f | 0@5 | m | 0@12 | t | 0@19 | _ | 0@26 |
| F | 1@5 | M | 1@12 | T | 1@19 | | |
| g | 0@6 | n | 0@13 | u | 0@20 | | |
| G | 1@6 | N | 1@13 | U | 1@20 | | |

Fig. 2

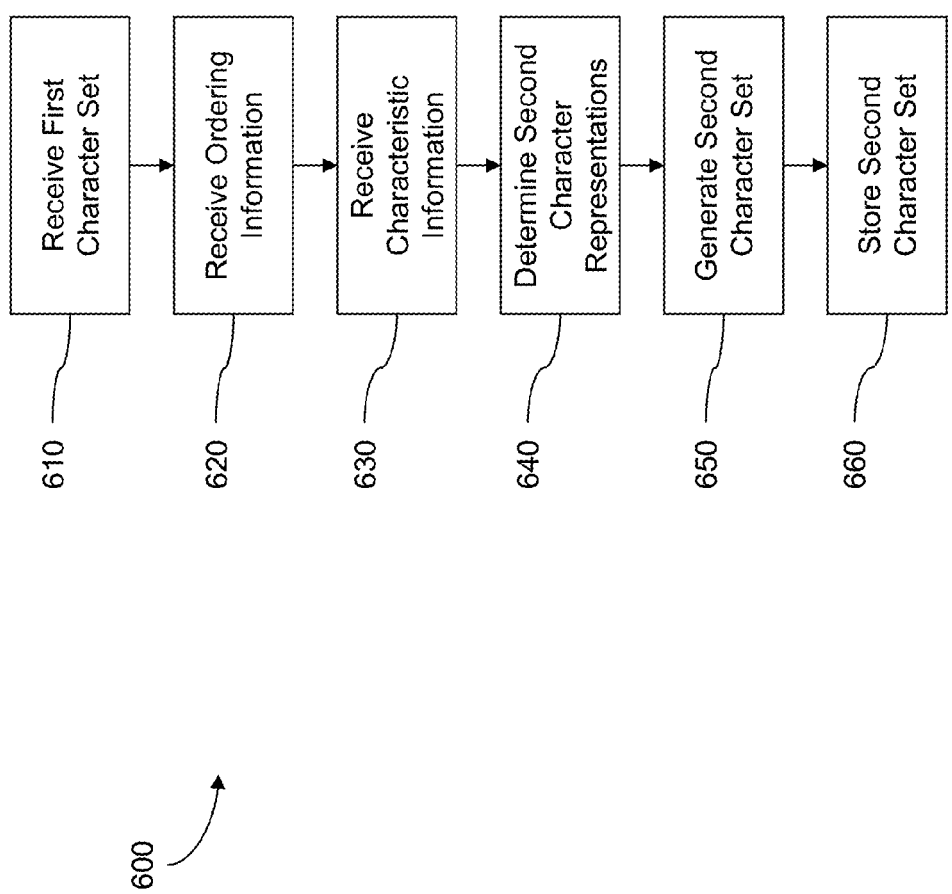

| | | | | | |
|---|---|---|---|---|---|
| (20) | @0000 | ' (60) | @0001.100.11.01101 | B (42) | 1.0@0100.0.0 | M (4D) | 1@1001
| , (2C) | @0001.000 | ^ (5E) | @0001.100.11.01110 | c (63) | 0@0100.0.1 | n (6E) | 0@1010
| . (2E) | @0001.001 | | (7C) | @0001.100.11.01111 | C (43) | 1@0100.0.1 | N (4E) | 1@1010
| ? (3F) | @0001.010 | ~ (7E) | @0001.100.11.10000 | d (64) | 0@0100.1 | o (6F) | 0@1011.0
| ' (27) | @0001.011 | 0 (30) | @0001.101 | D (44) | 1@0100.1 | O (4F) | 1.0@1011.0
| - (2D) | @0001.100.00 | ¼ (BC) | @0001.110.00 | e (65) | 0@0101 | œ (153) | 1.1.0@1011.0
| " (22) | @0001.100.01 | ½ (BD) | @0001.110.01 | E (45) | 1.0@0101 | Œ (152) | 1.1.1@1011.0
| ( (28) | @0001.100.10.00 | ¾ (BE) | @0001.110.10 | é (E9) | 1.1.00@0101 | p (70) | 0@1011.1.0
| ) (29) | @0001.100.10.01 | 1 (31) | @0001.111 | É (C9) | 1.1.01@0101 | P (50) | 1@1011.1.0
| : (3A) | @0001.100.10.10 | 2 (32) | @0010.000 | ê (E8) | 1.1.10@0101 | q (71) | 0@1011.1.1
| ; (3B) | @0001.100.10.11 | 3 (33) | @0010.001 | Ê (C8) | 1.1.11.000@0101 | Q (51) | 1@1011.1.1
| ! (21) | @0001.100.11.0.000 | 4 (34) | @0010.010 | ê (EA) | 1.1.11.001@0101 | r (72) | 0@1100.0
| @ (40) | @0001.100.11.0.001 | 5 (35) | @0010.011 | Ê (CA) | 1.1.11.010@0101 | R (52) | 1@1100.0
| % (25) | @0001.100.11.0.010 | 6 (36) | @0010.100 | ë (EB) | 1.1.11.011@0101 | s (73) | 0@1100.1
| & (26) | @0001.100.11.0.011 | 7 (37) | @0010.101 | Ë (CB) | 1.1.11.100@0101 | S (53) | 1.0@1100.1
| * (2A) | @0001.100.11.0.100 | 8 (38) | @0010.110 | f (66) | 0@0110.0 | $ (160) | 1.1.0@1100.1
| + (2B) | @0001.100.11.0.101 | 9 (39) | @0010.111 | F (46) | 1@0110.0 | t (74) | 0@1101
| = (3D) | @0001.100.11.0.110 | a (61) | 0@0011 | g (67) | 0@0110.1.0 | T (54) | 1.0@1101
| # (23) | @0001.100.11.0.111 | A (41) | 1.0@0011 | G (47) | 1@0110.1.0 | u (75) | 0@1110.00
| / (2F) | @0001.100.11.1.00000 | â (E0) | 1.1.00@0011 | h (68) | 0@0110.1.1 | U (55) | 1.0@1110.00
| \ (24) | @0001.100.11.1.00001 | Â (C0) | 1.1.01@0011 | H (48) | 1@0110.1.1 | v (76) | 0@1110.01
| § (A7) | @0001.100.11.1.00010 | â (E1) | 1.1.10@0011 | i (69) | 0@0111 | V (56) | 1.00@1110.01
| £ (A3) | @0001.100.11.1.00011 | Â (C1) | 1.1.11@0011 | I (49) | 1.0@0111 | w (77) | 1.01@1110.01
| ¢ (A2) | @0001.100.11.1.00100 | ä (E4) | 1.1.1.0000@0011 | Ï (CC) | 1.1.0@0111 | W (57) | 1.10@1110.01
| < (3C) | @0001.100.11.1.00101 | Ä (C4) | 1.1.1.0001@0011 | Ï (CD) | 1.1.1@0111 | x (78) | 0@1110.10.00
| \ (5C) | @0001.100.11.1.00110 | ã (E5) | 1.1.1.0010@0011 | j (6A) | 0@1000.0.0 | X (58) | 1.0@1110.10.00
| > (3E) | @0001.100.11.1.00111 | Ä (A5) | 1.1.1.0011@0011 | J (4A) | 1@1000.0.0 | y (79) | 0@1110.10.01
| _ (5F) | @0001.100.11.1.01000 | å (E2) | 1.1.1.0100@0011 | k (6B) | 0@1000.0.1 | Y (59) | 1.0@1110.10.01
| [ (5B) | @0001.100.11.1.01001 | Å (C2) | 1.1.1.0101@0011 | K (4B) | 1@1000.0.1 | z (7A) | 0@1110.10.10
| ] (5D) | @0001.100.11.1.01010 | ā (E3) | 1.1.1.0110@0011 | l (6C) | 0@1000.1 | Z (5A) | 1.0@1110.10.10
| ( (7B) | @0001.100.11.1.01011 | Ā (C3) | 1.1.1.0111@0011 | L (4C) | 1@1000.1 | Ž (17D) | 1.1.0@1110.10.10
| ) (7D) | @0001.100.11.1.01100 | b (62) | 0@0100.0.0 | m (6D) | 0@1001 | | |

Fig. 7

SYSTEMS AND METHODS FOR REPRESENTING TEXT

FIELD OF THE INVENTION

The present invention generally relates to representing data and more specifically relates to representing text.

BACKGROUND

A common need of software applications is to sort data. And while computer systems can work with many kinds of data, only binary values can be represented natively. Written human languages are not designed as mathematical representations, and thus are only represented indirectly in computers by using artificial numerical representations, rather than as glyphs or symbols written using paper and ink.

Because text strings are not a native data format for a computer, text strings are typically represented using a sequence of numbers, each representing a character in the text string. While numbers can be represented naturally in a binary system, such as in a computer, text is designed to represent human language, such as symbols representing letters, concepts, or phonemes. Common systems for representing text assign each glyph or character of a chosen language or alphabet a number. Such systems have been used at least since Émile Baudot used 5-bit representations for letters, punctuation, and control characters in the late 1800s.

Thus, to represent a human-language text string in a computer, a sequence of characters or glyphs is entered as a sequence of the corresponding numerical representation of each character or glyph. A common Baudot-type representation or encoding scheme for text strings is the American Standard Code for Information Interchange, or ASCII. In an ASCII encoding scheme, each character is assigned a numeric value. For example, the capital letters from 'A' to 'Z' are assigned values from 65 to 90 (in decimal), inclusive, while the lower-case letters from 'a' to 'z' are assigned values from 97 to 122, inclusive.

However, in some cases it is desirable to have different characters regarded as equivalent. For example, when sorting multiple text strings, it may be desirable to treat a capital 'T' as being equivalent to a lower-case 't.' Thus, the word "test" may be represented by many different text strings, such as with capital letters (TEST), mixed capital and lower case letters (Test), or all lower case letters (test). However, when sorting or comparing these three text strings, in some cases, they should be regarded as equivalent. Thus, when using a conventional character set, it may be necessary to temporarily convert all three text strings to an equivalent text string having a normalized representation, such as all capitals ("TEST"), so that when the text strings are compared, they are determined to be equivalent.

Thus, to ensure sorting functions generate the expected results, because the same text may be represented in a number of different ways, text strings are typically pre-processed to be put into a consistent, equivalent representation, e.g. all capitals, so that comparisons achieve an expected result. For example, without any pre-processing, a sort function may sort the text string "Test" before the text string "apple" because the capital 'T' in 'test' has a lower numerical value (84 in ASCII) than the lower-case 'a' (97 in ASCII) in 'apple.' This is not an expected result in most cases if the text strings were to be sorted in alphabetical order. Thus, pre-processing, which imposes extra computational overhead, is typically used to ensure comparisons are handled correctly. However, reformatting text in connection with a comparison can slow the sort process. In addition, if text is stored in a database, this overhead may be needed each time data is accessed and sorted.

An alternate approach is to store both a normalized version of a text string (such as a so-called sort key) as well as the original text string. Thus, sorts may be performed based on the normalized text string, but a request for the text string, such as to display to a user, would return the original text string. However, storing two versions or copies of the same data uses additional resources and may be inefficient. Thus, it would be advantageous to represent text strings in a manner that allows a representation of a desired set of characters, but also allows for sorting without the need for pre-processing to ensure the sort function returns the expected results. It would also be advantageous for such a representation to not consume additional memory to store multiple versions of the same text string.

SUMMARY

Embodiments of the present invention provide systems and methods for representing text. For example, one embodiment of the present invention is a method comprising receiving a plurality of text strings, each text string comprising at least one character, wherein the at least one character has a representation comprising a first part and a second part; receiving a request to sort the plurality of text strings; and sorting the plurality of text strings based on the first parts of the at least one characters of the plurality of text strings. In another embodiment, a computer-readable medium comprises program code for causing a processor to execute such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIG. 1 shows a character set for a conventional text representation;

FIG. 2 shows a character set with characters having two-part representations according to one embodiment of the present invention;

FIGS. 4-6 show methods for representing text according to one embodiment of the present invention; and FIG. 7 shows a character set with characters having two-part representations according to one embodiment of the present invention.

DETAILED DESCRIPTION

Figure 3:
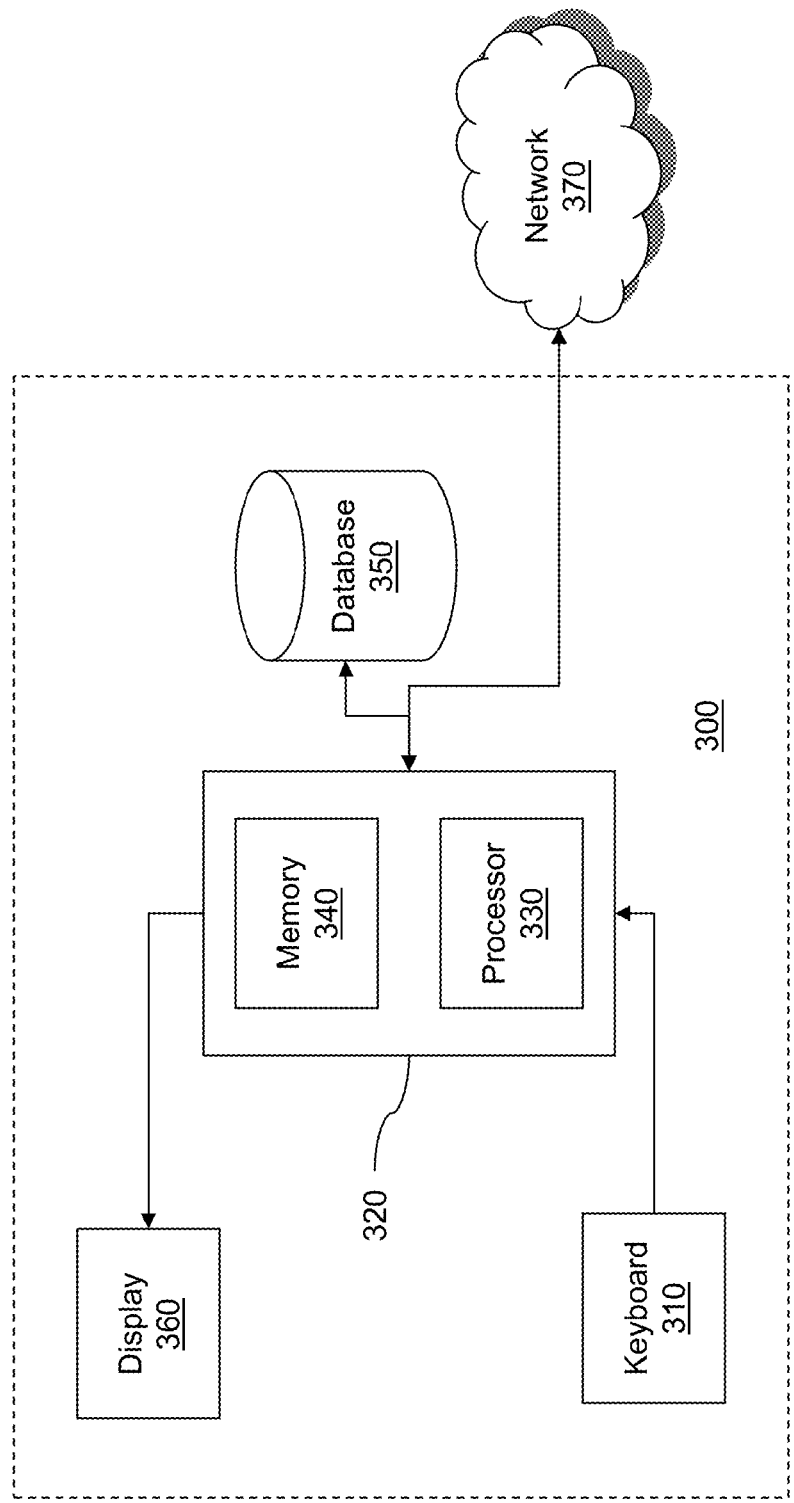
FIG. 3 shows a system for representing text according to one embodiment of the present invention.

Embodiments of the present invention provide systems and methods for representing text. The following disclosed embodiments are intended to provide illustrative examples of embodiments of systems and methods for representing text. This disclosure is not intended to be exhaustive, and other embodiments are within the scope of this disclosure. The following paragraphs provide some general discussion intended to introduce terminology used throughout this disclosure. It is intended to provide context for some disclosed embodiments, but is not intended to limit the scope of this disclosure in any way.

Illustrative Representation of Text Data

In a conventional character set, the character set includes the letters of the English alphabet from A-Z, in both upper and lower case, and a 'space' character (represented here with the character '_'), such as the Baudot-like encoding shown in FIG. 1. Such a character set has similar problems as those discussed above. For example, the character 'Z' will be sorted before the character 'a' because 'Z' has a lower encoded value (25) than 'a' (26). This can be addressed by temporarily or permanently re-encoding 'Z' to be 'z' or 'a' to be 'A' in a particular text string. However, one illustrative embodiment of the present invention provides an alternate encoding to allow a representation of text to have an arbitrary combination of characters, while still sorting correctly without pre-processing. An illustrative character set according to one embodiment of the present invention could be represented as shown in FIG. 2.

In such an embodiment, each character is represented by a two-part code in the table, the parts separated by the '@' symbol. Note that the '@' symbol is purely for illustrative purposes and is not a part of the representation. The two parts of the code represent (1) membership within a class or group of characters and a sort priority, and (2) the specific character within the class of characters. For example, in this embodiment, the characters 'e' and 'E' each have the same second part, 4, indicating membership of the class of characters corresponding to the letter 'E.' But each has a different first part, indicating the particular representation of the letter 'E,' namely, in this simple character set, whether the representation is of an upper case 'E' or a lower case 'E.' Thus, when text must be output, the correct character can be selected by using both parts of the representation. The differences in the representations of the text string 'Test' between the two character sets is apparent:

First Encoding: Test—19 30 44 45
Second Encoding Test—1 0 0 0@19 4 18 19

In this illustrative embodiment, the second encoding represents the text string 'Test' by using the two-part encodings for each letter in the text string. For example, the letter 'T' in this embodiment is represented by the character code 1@19, wherein 19 represents the character class and 1 represents which member of the character class is used. In this embodiment, because each character class only includes two members, the first part of each encoded character, which indicates a particular member of a character class, may be stored in a single bit. Further, because there are only 26 character classes, the second part of each character encoding may be represented by 5 bits. Thus, any individual character within the character set may be stored in 6 bits. This is the same number of bits that would be required to indicate a particular character in the character set shown in FIG. 1. Further, each of the two parts of the second encoding are required to select a particular character in the character set. For example, if a first part has a value of 1, then 26 different individual characters correspond to such a first part. Alternatively, if the second part has 19, then 2 different individual characters correspond to such a second part. Thus, the combination of the first part and the second part is needed to specify the exact character.

To construct a text string using characters from the character set in FIG. 2, the first parts of each character in the text string are grouped together, followed by a grouping of the second parts of each character. Thus, the character string 'Test' is represented by 1 0 0 0@19 4 18 19, or four bits indicating the first parts of each symbol in the string, 1000, and 20 bits indicating the character classes of each symbol in the text string, 10011001001001010011, for a 24-bit binary representation of the text string of 100010011001001001010011. In a corresponding Baudot-based example, such as ASCII or the simplified character set in FIG. 1, the same text string would require the same number of bits. In the case of the Baudot-based character set in FIG. 1, the 24-bit binary representation of the corresponding text string would be 010011011110101100101101.

In this illustrative embodiment, the same number of bits is required to represent each character in each of the character sets shown in FIGS. 1 and 2. However, some embodiments discussed below will demonstrate that memory savings may be achieved using a two-part encoding scheme instead of a traditional Baudot-type character set encoding.

Further, it becomes apparent that sorting using the second encoding does not require pre-processing the text strings. For example, if the text strings 'Test' and 'apple,' as represented using the first character set, need to be sorted, a process similar to the following may be employed:

| (1) Retrieve text strings to be sorted: | |
|---|---|
| Candidate text string: | Test - 19 30 44 45 |
| Candidate text string: | apple - 26 41 41 37 30 |
| (2) Temporary Normalization: | |
| Candidate text string: | TEST - 19 4 18 19 |
| Candidate text string: | APPLE - 0 15 15 11 4 |
| (3) Sort: | |
| Compare 19 to 0 | |
| (4) Result: | |
| First text string: | apple |
| Second text string: | Test |

In contrast, using the second character set, no normalization is needed:

| (1) Retrieve text strings to be sorted: | |
|---|---|
| Candidate text string: | Test - 1 0 0 0 @ 19 4 18 19 |
| Candidate text string: | apple - 0 0 0 0 0 @ 0 15 15 11 4 |
| (2) Sort: | |
| Compare 19 to 0 | |
| (3) Result | |
| First text string: | apple |
| Second text string: | Test |

Thus, the second character set can significantly reduce the number of steps required to sort of a series of text strings or even to compare two text strings, without consuming additional memory to store a second, normalized version of the text string, such as a sort key. An advantage of such sort efficiency may be realized when sorting records retrieved from a database. For example, when sorting thousands or millions of records in a database, such as by name, the number of operations required to normalize every character of each name to be compared can be very high. Alternatively, if normalization is only done once, but the normalized text string is maintained, memory allocation requirements will likely be increased to store both the normalized version of the text string and the original version of the text string.

Further, some embodiments of the present invention discussed in more detail below may take advantage of characteristics of two-part text string encodings to compare entire text strings using three processor instructions: two processor instructions to load two CPU registers with text strings to be compared, and one processor instruction to perform the comparison. Thus, by employing embodiments of systems and methods for representing text, such as those disclosed herein, it may be possible to reduce or eliminate normalization overhead, such as storage overhead, processing overhead, or both, or to increase the speed of individual text string comparisons.

Illustrative System for Representing Text

Referring now to FIG. 3, FIG. 3 shows a system 300 for representing text according to one embodiment of the present invention. The system 300 comprises a computer 320, a database 350, a keyboard 310, and a display 360. In addition, computer 320 is in communication with a network 370. The computer 320 comprises a processor 330 and a memory 340, and is in communication with the database 350, the keyboard 310, and the display 360. The processor 330 is in communication with the memory 340 and is configured to execute program code stored within the memory 340. Memory 340 may comprise one or more types of computer-readable media, which are described in greater detail below, and is configured to store program code and data for use by the processor 330.

The database 350 is configured to store data for use by the processor 330 and, in some embodiments, other computers or processors. While suitable databases may be commercially available from vendors; the term 'database' is not intended to refer only to such database systems. Rather, database simply refers to a collection of data. Thus, a suitable database 350 may comprise one or more files, such as flat files, or data stored in memory. The database 350 in the embodiment shown is an in-memory object-oriented database as described in co-pending U.S. patent application Ser. No. 12/571,521, entitled "Systems and Methods for Managing Databases," filed Oct. 1, 2009; however in some embodiments the database 350 may be another type of database, such as a relational database with a relational database management system (DBMS) or an object-oriented database with an object-oriented DBMS.

In the embodiment shown, keyboard 310 is configured to transmit signals to the computer 320, such as based on keystrokes made by a user. In one embodiment, the system 300 is configured to receive signals from the keyboard 310 that represent symbols or characters typed by a user. For example, a conventional keyboard 310 comprises a plurality of keys, each of which corresponds to one or more symbols or characters. The signals received from the keyboard 310 typically each comprise one or more symbols or characters according to an encoding scheme specific to the particular keyboard being used. Thus, upon receiving signals from the keyboard, the computer 320 typically converts the signals received from the keyboard 310 into a character according to a correspondence to a character in a character set used by the computer. If a signal received from the keyboard comprises a symbol that is not a character, the computer 320 may buffer the symbol until a full character has been received, it may store or transmit the symbol, such as to an application, without converting the symbol into a character, or it may buffer the symbol until a full character has been received.

In the context of this application, the term 'character' is generally used to refer to a sequence of one or more symbols that occupies a single entry within a character set, while a 'symbol' generally refers to a single letter or mark from an alphabet, a set of punctuations, a set computer text string symbols, etc, that may or may not exist as an independent entry in a character set. For example, in one embodiment, 'a' is a symbol and it is also a character. Similarly, a space (' '), a period ('.'), or a null ('\0') may also be symbols and characters. However, a character may also comprise a plurality of symbols, such as 'à', 'ae,' 'qu,' or 'Mc' or 'Mac,' that may be interpreted as a single character of a particular alphabet, or simply as a single unit for sorting purposes. However, in various embodiments of the present invention, the particular characters in a character set may be specially defined for the specific character set, regardless of whether such characters are conventionally regarded as characters. For example, any arbitrary collection of symbols may be defined as a character in an embodiment, e.g. 'asdf' is defined as a character in one embodiment.

Characters may then be used to create text strings. A text string is a sequence of one or more characters. Thus, the following are examples of text strings according to some embodiments of the present invention: "The quick brown fox jumped over the lazy dog," "Mary," or a null string ("\0").

A character set comprises one or more characters, where each character has an associated numerical value. For example, and as discussed above, ASCII defines a character set. Similarly, the tables shown in FIGS. 1 and 2 define character sets. Still other character sets are possible according to embodiments of the present invention.

Two-Part Character Representations

In the embodiment shown in FIG. 3, the computer 320 employs a character set wherein each character has a corresponding two-part representation. The two-part representation comprises a first part and a second part. One of the two parts represents an equality part (EP) and the other part represents a differentiator part (DP). The general representation of a character may be written as EP@DP or DP@EP in some embodiments. In one embodiment of the present invention, the first part comprises the equality part and the second part comprises the differentiator part, though in some embodiments the first part comprises the differentiator part and the second part comprises the equality part. The equality part generally represents sort priority of the character within the context of the character set. In addition, the equality part also represents a class or group of characters. Because a character class may be physically represented in a number of ways that may not affect the sort priority of the character itself, the equality part may not include sufficient information to correctly represent a particular character. For example, it is not possible to tell from the equality part whether the character class 'A' should be represented by the character 'A,' the character 'a,' or the character 'á.' However, because such additional information is typically not relevant to sorting functions, the first part comprises sufficient information to sort a set of characters. However, if the character 'á' should be sorted according to a different priority than the character 'a,' a different character class 'Á' may be created.

The differentiator part of a character representation comprises information indicating a specific representation of the abstract character—a particular instance of the character, in object-oriented terminology. A character may have a large number of potential representations, each of which may be independently represented within the character set. Thus, the differentiator part indicates the specific representation of the character to be used. And similar to the equality part, a specific character cannot typically be determined solely by the differentiator part. For example, a capital 'A' would have a first value in the differentiator part, a lower case 'a' would have a second value in the differentiator part, a capital 'Á' would have a third value in the differentiator part, and a lower-case 'á' would have a fourth value in the differentiator part. However, each of these characters might have the same value in the equality part, if they each are each characters from the same class of characters, such as shown in the table below:

| Character | Equality Part | Differentiator Part |
|---|---|---|
| A | 0 | 0 |
| a | 0 | 1 |
| Á | 0 | 2 |
| á | 0 | 3 |

Alternatively, in some embodiments, each character may be written using the @ representation given above. For example, 'A' may be represented as 0@0 and 'a' may be represented as 1@0, using DP@EP notation, or as 0@0 and 0@1, using EP@DP notation.

Further, because the character set is intended to be used in a computer system in one embodiment of the present invention, the equality part and the differentiator part of a character are represented as bit fields, which can be of fixed or variable lengths. In one embodiment, the bit fields are not intended to represent binary values. However, some embodiments, one or both parts may be represented by numerical values.

In one embodiment that represents an equality part as a bit field, comparisons between two equality parts are accomplished by a bit-by-bit comparison of the two equality parts, beginning with the most significant bit of each equality part. For example, if two equality parts are compared where the first equality part has a bit field represented by 1101001 and the second has a bit field represented by 1100, the comparison begins with the most significant bit of each bit field. In this embodiment, the left-most bit of the bit fields as written above correspond to the most significant bit, though in some embodiments, the right-most bit may correspond to the most significant bit. Thus, a comparison between the bit fields would proceed as follows:

First Comparison: (1) <u>1</u>101001 to (2) <u>1</u>100=>(1) and (2) are equal

Second Comparison: (1) 1<u>1</u>01001 to (2) 1<u>1</u>00=>(1) and (2) are equal

Third Comparison: (1) 11<u>0</u>1001 to (2) 11<u>0</u>0=>(1) and (2) are equal

Fourth Comparison: (1) 110<u>1</u>001 to (2) 110<u>0</u>=>(2) is less than (1)

Thus, based on the comparison above, the second bit field would be placed before the first bit field in a sorted list. However, in some embodiments, a 0 may be regarded as greater than a 1. In such an embodiment, the first bit field would be placed before the second bit field in a sorted list. For example, such an embodiment may be used when a sort in reverse order is desired.

In one embodiment of the present invention, a set of characters is represented by equality parts and differentiator parts having bit fields of fixed lengths. For example, the Latin alphabet includes 26 letters. Thus, to represent each of these letters, five bits would be needed as there are 32 different bit patterns that may be represented by five bits. Such an embodiment includes six additional spaces for other abstract characters. The differentiator part may then be represented by a fixed-length bit field, such as a 1-bit bit field. Such an embodiment may not allow for a very robust character set, but could indicate upper and lower cases for each class of characters.

Alternatively, equality parts and differentiator parts may be represented by bit fields having variable lengths. For example, in one embodiment, an equality part may comprise a bit field having variable length between three and eight bits. Such an embodiment may map classes of characters as follows to three bits:

| Equality Part | Character Class |
|---|---|
| 000 | A, B, C, D |
| 001 | E |
| 010 | F, G, H |
| 011 | I |
| 100 | J, K, L, M |
| 101 | N, O, P, Q, R, S |
| 110 | T |
| 111 | U, V, W, X, Y, Z |

However, because some three-bit combinations represent more than one letter, additional bits may be used. For example, bit field 101 may be expanded as follows:

| Equality Part | Character Class |
|---|---|
| 101.0 | N |
| 101.1.0.00 | O |
| 101.1.0.01 | P |
| 101.1.0.10 | Q |
| 101.1.0.11 | R |
| 101.1.1 | S |

Thus, in this embodiment, character class 'N' is represented by four bits, while character classes 'O,' 'P,' 'Q,' and 'R,' are represented by seven bits, and character class 'S' is represented by five bits. The '.' notation used above is simply for ease of reading the bit fields and do not represent values. Thus, the 3-bit field represented by 101 indicates the group of character classes represented by 'N,' 'O,' 'P,' 'Q,' 'R,' 'S,' while the 4-bit bit field 101.0 (or 1010) uniquely represents the character class 'N.' Similarly, the 5-bit bit field 10110 represents the group of character classes 'O,' 'P,' 'Q,' 'R,' while the 5-bit bit field 10111 uniquely represents the character class 'S.'

A further feature of the equality part is that in some embodiments, a character set may have equality parts in any sort order. For example, while it is conventional in the English language to sort letters alphabetically in order from 'A' to 'Z,' in some embodiments, a different sort order may be advantageous. In such an embodiment, equality parts may be assigned to character classes based on the desired "correct" sort order.

A similar encoding scheme may be used for particular characters within a character class. For example, in one embodiment, the character class 'E' has several characters as members of the class: 'E,' 'e,' 'È,' 'è,' 'É,' 'é,' 'Ê,' 'ê,' 'Ë,' and 'ë.' One variable-length encoding scheme may be as follows:

| Differentiator Part | Character |
|---|---|
| 0 | e |
| 1.0 | E |
| 1.1.00 | é |

| Differentiator Part | Character |
|---|---|
| 1.1.01 | É |
| 1.1.10 | è |
| 1.1.11.000 | È |
| 1.1.11.001 | ê |
| 1.1.11.010 | Ê |
| 1.1.11.011 | ë |
| 1.1.11.100 | Ë |

Thus, to fully express the character 'e' using its equality part and its differentiator part in DP@EP notation, 'e' would be represented as 0@001. Similarly, in EP@DP notation, 'e' would be represented as 001@0. However, 'Ë' would be represented as either 1111100@001 or 001@1111100. Thus, in one embodiment using a variable-length encoding scheme, commonly-occurring characters, such as 'e' may be represented by fewer bits than more rarely used characters, such as 'Ë.' Such an encoding scheme may allow for more efficient usage of memory, particularly if character bit fields need not be aligned with byte or word boundaries used by a processor.

In some embodiments of the present invention it may be possible to use variable-length bit fields to more efficiently use memory resources. For example, in the embodiment discussed above, commonly used character classes, such as 'E' and 'T,' were assigned to 3-bit bit fields for the equality parts. Thus, a character from the character class 'E' may be represented by fewer bits than a character from the character class 'O.' Thus, text strings comprising the character 'e' may use less memory than text strings containing the letter 'ö.'

Once a character set has been selected, it may be possible to create text strings having multiple characters. In one embodiment of the present invention, a text string is represented by four parts: (1) the length of the text string, in bits, (2) an equality part having all the equality parts of all the characters in the string in the same sequence as the characters in the string, (3) a differentiator part having all the differentiator parts of all the characters in the string in the same sequence as the characters in the string, and (4) a bit position indicating the second part of the text string. In one embodiment, the equality part of the text string is located before the differentiator part of the text string. In such an embodiment, the bit position indicates the first bit of the differentiator part. In one embodiment in which the differentiator part is located before the equality part, the bit position indicates the first bit of the equality part. Thus, according to one embodiment of the present invention, a string may have the following format, where bit 0 is the most significant bit of the representation of the text string:

| Bits 0 to 31 | Bits 32 to 63 | Bits 64 to N | Bits (N + 1) to P |
|---|---|---|---|
| Length of the text string (in bits) | Bit position (N + 1) of the first bit of the differentiator part | A bit field representing the equality part of the text string | A bit field representing the differentiator part of the text string |

Other embodiments of the present invention may comprise other formatting conventions. However, it may be advantageous to locate all of the equality bits consecutively in the same sequence as the characters in the text string. Such an embodiment may be easier to sort because the equality part may be able to be loaded into a comparison register or variable without a need to assemble multiple equality parts located throughout a text string. Though in some embodiments, equality parts or differentiator parts, or even individual equality parts or differentiator parts, may be broken up and stored throughout the text string.

It may be possible to extract one or more characters from a representation of a text string. For example, if a text string stored in memory as a bit field, it may be necessary to display part or all of the text string on a display, such as for a user to view. In one embodiment of the present invention, individual characters from a text string may be extracted. In one embodiment using the character set depicted in FIG. 7, a text string may be formatted as shown in the table above. Thus, to extract a character from the text string, a processor may read four bits from the equality part. In the embodiment shown in FIG. 7, if the first four bits read comprise 0000 or 0011, for example, then the processor has read the entire equality part of the character because no character class in the embodiment shown in FIG. 7 has an equality part that begins with a 0000 or 0011 has more than four bits of information. Conversely, if the first four bits read from the equality part are 0001, three additional bits must be read because every character in the character set shown in FIG. 1 has at least seven bits in the differentiator part. After the next three bits are read, the processor determines whether additional bits must be read as well.

Once the equality part of a character has been fully read, it is possible to read the differentiator part of the character. Similar processing rules apply for the differentiator part. For example, if the equality part had 0011, and the first bit of the differentiator part is a 0, then the processor determines that the entire character has been read, because only character with equality part 0011 and whose differentiator part begins with 0 exists within the character set. However, if the first bit from the differentiator part is a 1, at least 1 additional bit must be read.

As can be seen in the representation shown in FIG. 7, the period delimiters in the equality parts and differentiator parts indicate the size of a particular portion of the equality or differentiator part. An example using pseudo-code for translating from the character set shown in FIG. 7 into a Unicode character set is set forth in Appendix A.

Because some embodiments of the present invention employ variable length bit fields, it may be necessary to provide information describing characteristics of text strings. For example, because a text string may contain a plurality of characters, it may not be possible to determine the boundary between DP bit fields and EP bit fields.

For example, FIG. 7 shows a character set according to one embodiment of the present invention, wherein each character in the character set comprises a first part and a second part (each character is also shown with its conventional ASCII character code). As can be seen in FIG. 7, each character comprises an equality part and a differentiator part, each part having a variable length bit field from 0 to 15 bits. For example, the character '}' has an equality part represented by a 15-bit bit pattern, 000110011101100, and a differentiator part represented by a 0-bit bit pattern. In the character set shown in FIG. 7, some character classes only have one character and thus do not need a differentiator part. Though in some embodiments, a differentiator part may be represented by a bit field having one or more bits.

Embodiments of the present invention may provide advantages over other systems or methods for representing text, including reduced memory requirements and reduced processing resources. Modern databases can store millions or more records and may need to sort very large numbers of records on a regular basis. For example, databases used by large companies to store customer information may have tens or hundreds of millions of customer records. Storing text strings and sort keys for each of these records may require using significantly more data storage than would be required when using embodiments of the present invention. Alternatively, comparison and sorting functions that require normalization functions consume significant processing resources. In contrast, embodiments of the present invention do not require such normalization and may significantly reduce processing requirements when manipulating, comparing, or sorting text strings.

Figure 4:
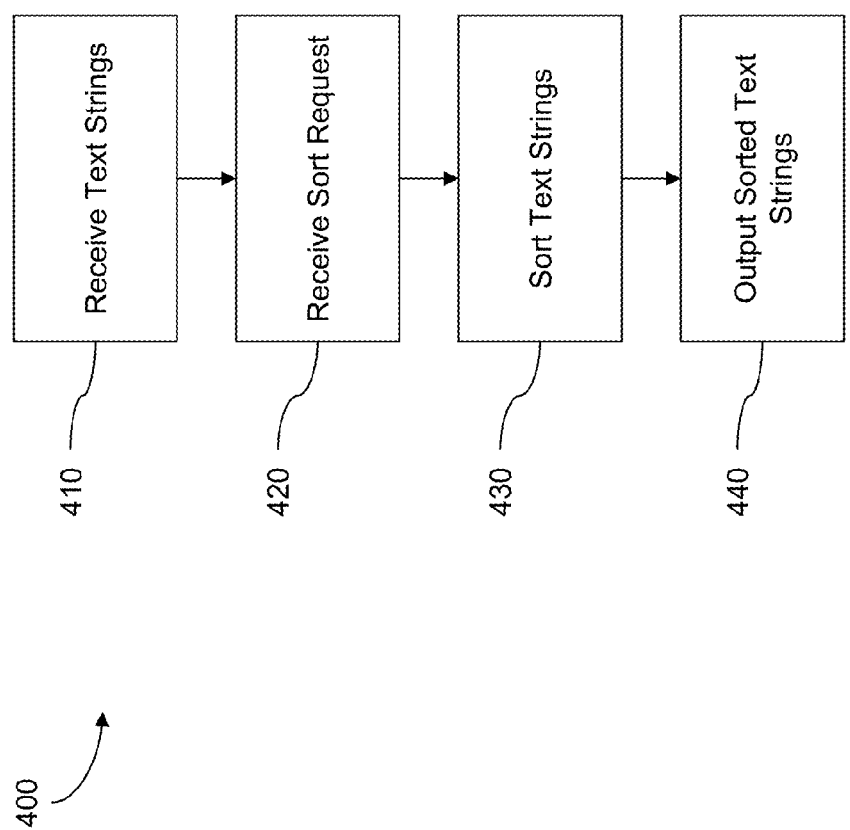

Referring now to FIG. 4, FIG. 4 shows a method 400 for representing text according to one embodiment of the present invention. The embodiment shown in FIG. 4 generally relates to sorting text strings represented in a two-part format. The method 400 will be described with respect to the system 300 shown in FIG. 3.

In the embodiment shown in FIG. 4, the method begins at block 410 when the processor 330 receives a plurality of text strings, each text string comprising at least one character, wherein the at least one character has a representation comprising a first part and a second part. For example, in one embodiment, the processor 330 may receive a plurality of text strings from the database 350 in response to a request for records in the database. In another embodiment, the processor 330 may execute an application that receives a plurality of text strings from a database 350 or that may be stored in the application's memory. In still another embodiment, the processor 330 may execute a DBMS which may receive a plurality of text strings.

The text strings may be received as individual text strings stored in memory, as bits in a data stream, or as parts of records from a relational, object-oriented, or other database. In one embodiment, text strings may be received from a keyboard based on a user's keystrokes. In another embodiment, text strings may be received from a second processor in communication with the processor 330, such as over a network. After receiving the plurality of text strings, the method proceeds to block 420.

In block 420, the processor 330 receives a request to sort the plurality of text strings. For example, in one embodiment, the processor 330 executes a DBMS, which receives the request to sort a plurality of database records based on the plurality of text strings. In such an embodiment, the request may be a SQL request. In another embodiment, a spreadsheet application may receive a command, such as through a graphical user interface, to sort text strings within a spreadsheet. In still another embodiment, the processor 330 may receive an instruction embedded within a signal received from a network or another device that indicates a request for data to be sorted.

In step 430, the processor 330 then sorts the plurality of text strings. In one embodiment of the present invention, the processor 330 executes a sort algorithm comprising instructions to compare two text strings. For example in one embodiment, the processor 330 executes a merge sort algorithm. In another embodiment, other sort algorithms may be employed, including quicksorts, bubble sorts, or insertion sorts, or other sort algorithms known to those of skill in the art. However, in some embodiments, sorting may include simply determining which of two strings has a higher sort priority, or comparing two strings for equivalency.

Many sort algorithms employ comparison operations that are used to sort a set of data. Thus, the data items are compared against each other, two at a time, to determine a sorted order. In embodiments of the present invention, text strings comprising characters represented by two parts may be sorted based on equality parts. Thus, when two text strings are selected during the sort algorithm to be compared, the equality part of each text string is compared.

Embodiments of the present invention may employ one or more different mechanisms for comparison. For example, in one embodiment, the processor 330, such as a CPU, may comprise a plurality of registers for use in arithmetic operations. For example, in a processor having two registers for use in arithmetic operations, such as additions or integer comparisons, two text strings may be efficiently compared by making use of such registers. For example, in one embodiment, an equality part of the first text string may be loaded into a first register within the processor 330 and an equality part of the second text string may be loaded into a second register within the processor 330. In such an embodiment, the equality parts of each string may be loaded such that the most significant bit of an equality part is located at the most significant bit of a register. For example, referring to the variable length bit fields discussed above, a processor having two 32-bit registers capable of being used in integer compares may have the following values after being loaded with the text strings 'test' and 'three:' Spaces between equality parts of individual characters are included to aid in interpreting the contents of the register. The trailing 0s indicate whitespace in this embodiment.

Register 1: 1101 0101 1100 1101 0000000000000000 (test)
Register 2: 1101 0110 1100 0101 0101 000000000000 (three)

Thus, an integer comparison and a bit-by-bit comparison achieve the same result. The integer value of register 1 is 3,586,981,888, while the integer value of register 2 is 3,603,255,296. Thus, an integer comparison of the test strings result in the proper sort order according to the character set—'test' is sorted before 'three.' In this embodiment, the registers are interpreted as containing unsigned values. However, in some embodiments, the registers may be configured to represent signed values. In such embodiments, the most significant bit of a register may be set to 0, while the most significant bit of an equality part may correspond with the second most significant bit of the register to avoid setting the sign bit of the register.

In addition, in some cases an equality part of a text string may comprise a number of bits greater than the number of bits available in a register. In such a case, the number of bits of the equality part that may be contained within the register are stored in the register, beginning with the most significant bit of the equality part. If the comparison determines the contents of the two registers are equal, the remaining bits (or a portion of the remaining bits) are loaded into the register and the compare is executed again. This process continues until a sort order can be determined, or a determination that the two text strings are equivalent is made.

At step 440, the processor 330 outputs the text strings in a sorted order. In some embodiments, step 440 is an unnecessary step. For example, some sort algorithms operate in place. In such algorithms, a set of unsorted text strings may be located in a plurality of memory locations. The sort algorithm then sorts the text strings without moving them to a new set of memory locations. Rather, the locations of text strings within the plurality of memory locations are changed. At the conclusion of the sort process, the same plurality of memory locations has the sorted set of text strings. For example, if a plurality of text strings in an unsorted order are stored in an array, after sorting, the same array comprises the same plurality of text strings, but in a sorted order.

However, in some embodiments, it may be necessary to output the text string in a sorted order. For example, in one embodiment, a set of text strings within a set of database records requested from a database may be sorted by a DBMS, however, the database records sorted based on the plurality of text strings may then be output by the DBMS to an application that requested the sorted database records. In one embodiment, a set of text strings in sorted order may be stored on a non-volatile computer-readable medium, such as in a file on a hard drive.

Figure 5:
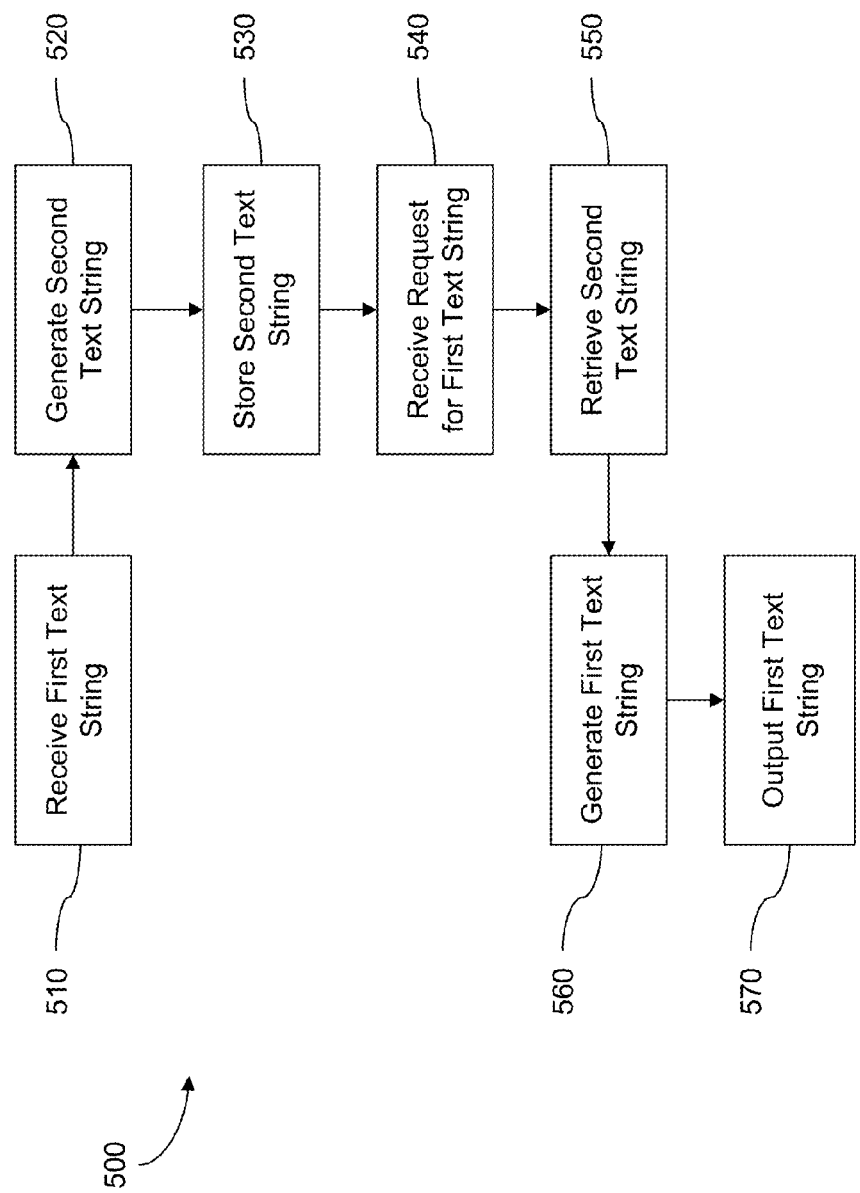

Referring now to FIG. 5, FIG. 5 shows a method 500 for representing text according to one embodiment of the present invention. The embodiment shown in FIG. 5 will be discussed with respect to the system 300 shown in FIG. 3.

The method 500 begins at step 510 when the processor 330 receives a first text string comprising characters in a first representation. For example, in one embodiment, the processor 330 receives a text string as a bit or byte stream, such as from reading a data file. The processor 330 receives a first text string in a first representation, such as an ASCII representation of the text string. If the data file has multiple text strings, the processor 330 may receive more than one text string. In another embodiment, the processor 330 may receive a text string from a keyboard as a user enters a sequence of symbols or characters using the keyboard. The keyboard may output a keyboard signal with symbols or characters in a first representation. The processor 330 receives the keyboard signal having the symbols or characters in the first representation.

In one embodiment, the processor 330 may receive data from a network 370 or from a database 350. In such an embodiment, the processor 330 may read text strings from a legacy database, which stores text strings in a first representation, such as in a Unicode representation. The processor 330 may translate the text strings from the first representation to a second representation according to one embodiment of the present invention. In such an embodiment, the processor 330 may not read all text strings from the legacy database. For example, as noted above, in some cases, text strings may be stored multiple times in a single record, such as in a normalized representation as well as an original representation. In one embodiment, the processor 330 may not receive the normalized representation, but only the original representation.

In step 520, the processor 330 then generates a second text string comprising characters in a second representation, wherein the second representation represents each character in two parts comprising a first part and a second part. In one embodiment, the processor 330 generates the second text string by mapping a character in the first text string to a corresponding character of the second representation. For example, the first text string may comprise a sequence of ASCII characters and the second representation may comprise the representations shown in the character set of FIG. 7. If the first character of the first text string comprises "a," the corresponding second representation would be 0@0011. However, some embodiments may employ additional steps. For example, in one embodiment, the first text string may comprise three characters in sequence corresponding to the letters "Mac." In one embodiment, in the second representation, "Mac" may correspond to a single character. Thus, as characters in the first text string are received, it may be necessary to received additional characters from the first text string to determine the proper corresponding character in the second representation.

For example, upon receiving an "M" in a first representation, the processor 330 may identify three potential corresponding characters: "M," "Mc," and "Mac." Upon receiving a second character in the first representation, "a," the processor 330 may identify two possible scenarios: that two characters in the second representation ("M" and "a") have been received, or that a partial character ("Ma") has been received. Upon receiving a third character, "c," the processor may still identify two possible scenarios: three different characters or one complete character. In such a case, additional processing may be required. For example, if a fourth character is received, "k," the processor 330 may determine that four individual characters have been received, spelling the word "Mack." But in some embodiments, the processor 330 may simply defer until a whitespace or punctuation character has been received to determine the corresponding characters in the second representation, such as by referring to a dictionary of words. After the processor 330 has generated the second text string, the method 500 proceeds to step 530.

In step 530, the processor 330 stores the second text string. For example, in one embodiment, the processor 330 stores the second text string in a record in a database 350. In another embodiment, the processor 330 stores the second text string in memory or in a file on a disk. After the processor 330 has stored the second text string, the method 500 proceeds to step 540.

In step 540, the processor receives a request for the first text string. For example, in one embodiment, the processor 330 may execute an application that stores text strings using the first representation, but accesses a database 350 that stores text strings using the second representation. In such an embodiment, the processor 330 receives the request for the first text string and translates the request to a database request. In another embodiment, the processor receives the request and accesses a memory location or file storing the second text string.

In step 550, the processor 330 then retrieves the second text string. In one embodiment, the processor retrieves the second text string from the record in the database in response to the request. For example, as described above, the processor 330 translates the request for the first text string into a database request for a corresponding record in the database. In response the processor 330 may receive the second text string from the database 350. In another embodiment, the processor 330 may retrieve the second text string from a memory location or from a file on a disk in response to the request.

In step 560, the processor 330 then generates the first text string from the second text string based at least in part on the first parts and the second parts of the characters in the second text string. For example, in one embodiment of the present invention, the processor 330 reverses the mapping performed at step 520 using the first parts and the second parts of the text string. However, because the first representation may comprises characters that are represented by a single character in the second representation, it may be necessary to maintain mapping information indicating such many-to-one mappings. For example, a mapping according to one embodiment of the present invention may indicate the character "Mac" in the second representation may correspond to three different characters ("M," "a," and "c") in the first representation. In addition, to translate from the second representation, the first part and the second part of each representation should be considered. For example, the character "a" in the character set shown in FIG. 7 is represented as 0@0011. In one embodiment, the mapping information may indicate that the second part, 0011, corresponds to the character "A" in the first character set, but that the first part of the second representation, 0, indicates that the character "a" should be selected instead. Thus, using such mapping information, the processor 330 generates the first text string from the second text string based at least in part on the first parts and the second parts of the characters in the second text string. The method 500 then proceeds to step 570.

In step 570, the processor 330 outputs the first text string. For example, in one embodiment, the processor 330 transmits the first text string to the application that requested the first text string from the database 350, as described above. In one embodiment, the processor 330 may translate the first text string into a third representation. For example, in one embodiment, the processor 330 may output the first text string by causing it to be displayed on a screen. In such an embodiment, the processor 330 may generate graphical images of the characters of the first text string by translating each of the characters in the first representation into a third representation, such as a bitmapped representation. In one embodiment, the processor 330 may output the first text string by transmitting the first text string as a bit or byte stream over a network or by writing it to a file. Still further embodiments would be apparent to one of skill in the art based on the preceding disclosure.

Referring now to FIG. 6, FIG. 6 shows a method 600 for representing text according to one embodiment of the present invention. The method 600 shown in FIG. 6 will be described with respect to the system 300 shown in FIG. 3.

At step 610, the processor 330 receives a first character set in a first representation, the first character set comprising a plurality of characters. For example, in one embodiment, the processor 330 receives a plurality of characters stored in a file on a disk or over a network. In this embodiment, the character set may comprise a known character set, such as an ASCII character set or a Unicode character set.

In step 620, the processor 330 then receives an ordering of the plurality of characters. For example, in one embodiment, the processor 330 receives a numerical rank of each character in the first character set. The numerical rank indicates a sort priority for a character relative to the other characters in the first character set. In one embodiment, the numerical rank indicates an alphabetic ordering. In some embodiments, it may indicate a numeric ordering or other ordering. The processor 330 may receive the ordering information from a file on a disk, from a database, from a user, or from another source. In one embodiment, the ordering information may be received as a part of the character set. After the ordering information has been received, the method 600 then proceeds to step 630.

In step 630, the processor 330 receives characteristic information describing characteristics of characters or classes of characters. For example, in one embodiment, the processor 330 receives characteristic information for one or more characters in the character set. The characteristic information may indicate that the characters "c" and "C" in the first character set are upper and lower case representations of the same class of character. The characteristic information may also comprise diacritic information, such as accents or pronunciation marks. For example the characteristic information may indicate that two characters of the character class "C" may comprise a cedilla mark ("ç" or " Ç "). Thus, in one embodiment, the characteristic information may indicate membership of characters in the first character set within a class of characters within a second character set. The characteristic information may also allow for characters to be represented in a second character set that are not represented in the first character set. For example, as may be seen in FIG. 7, a plurality of characters belong to the character class 0011 (corresponding to the Latin letter "A" and its variations). However, in a first character set, only upper case and lower case, un-accented letter "A"s may be represented. Thus, additional members of the character class "A" with various accents or other diacritics may be added and represented in the second character set based on the characteristic information.

In one embodiment, the characteristic information comprises frequency information. For example, in one embodiment, the characteristic information comprises percentages indicating the relative frequency each character is used within words of a language. For example, in English, the character "e" may have a high frequency value to indicate it is frequently used. In contrast, the character "x" may have a low frequency value to indicate it is infrequently used.

In step 640, the processor 330 then determines a second representation for each of the plurality of characters, each second representation having a first part and a second part, the second representations of the plurality of characters based on the ordering information and the characteristic information. In one embodiment the processor 330 determines that the first parts of the representations correspond to differentiator parts and the second parts of the representations correspond to the equality portion. In such an embodiment, the processor 330 determines a size of a bit field to represent the differentiator part and the equality part. In some embodiments, the differentiator parts and equality parts may have differently-sized bit fields, while in other embodiments they may have the bit fields of the same size. For example in one embodiment, the processor may determine that a 4-bit bit field should be used for the equality portion, however, that the 4-bit bit field may be expanded for some characters. Such a representation may be seen in FIG. 7.

To determine how equality portions are allocated, the processor 330 may refer to the ordering information or the characteristic information. For example, it may be advantageous to allocate first and second parts with fewer bits to characters with relatively high frequency values represented in the characteristic information. However, such allocations must be made in light of the requirements of the ordering information. Thus, it may not be possible to allocate 0@0 to the character "e" and 0@1 to the character "a" because it might violate ordering requirements.

In one embodiment, the processor 330 allocates equality portions to character classes according to frequency information and ordering information. For example, character classes A, E, I, M, N, and T may have relatively high frequency values for their respective characters. Thus, it may be advantageous to allocate 4-bit bit fields to these character classes, and to allocate extended, variable length bit fields to other character classes. As can be seen in the embodiment shown in FIG. 7, such an allocation has been made. After determining that these character classes should use 4-bit fixed-width bit fields, the remaining characters are allocated 4-bit bit fields as well as variable-length sub-fields. For example, as shown in FIG. 7, 'A,' 'E,' 'I,' 'M,' 'N,' and 'T' have been allocated equality parts having the values 0011, 0101, 0111, 1001, 1010, and 1101, respectively. Thus, the remaining character classes must be allocated 4-bit bit fields, in order, between these values. Thus, character classes 'B,' 'C,' and 'D' must share the 4-bit bit field 0100, which is the only bit field value that is ordered between 0011 and 0101. In this embodiment, such an allocation is necessary because the ordering information for 'B,' 'C,' and 'D' are different. However, if the characters had equivalent ordering information, it may be possible to represented each of the character classes 'B,' 'C,' and 'D' using a single equality bit field of 0100.

To accommodate multiple character classes sharing the same 4-bit bit field, the processor 330 then allocates additional sub-fields. The processor may employ frequency information to allocate sub-fields. In this case, because 'B,' 'C,' and 'D' must be represented, it would be possible to allocate a 2-bit sub-field, as 2 bits can accommodate up to 4 different character classes. However, because the characters of character class 'D' appears more frequently than the characters of character classes 'B' and 'C,' a 1-bit sub-field is selected because it may be more efficient—representing the 'D' character class only requires 5 bits rather than 6. If character classes 'B,' 'C,' and 'D' had similar frequency values, a 2-bit field may be more advantageous. In the embodiment shown in FIG. 7, 'B' and 'C' share the value 0 in the sub-field, while 'D' has value 1. This ordering is selected because, while 'D' has a greater frequency value, it has a lower sort value than 'B' and 'C', and thus must be assigned an equality part with a later sort ordering. Because, in this embodiment, comparisons are performed by a bit-by-bit comparison, the binary value of the bit fields of the equality parts may be misleading when determining sort order. Because 'B' and 'C' now share a sub-field, a further 1-bit sub-field must be allocated to each according to. Thus, the variable bit fields for 'B,' 'C,' and 'D' become 0100.0.0, 0100.0.1, 0100.1 respectively. Such an allocation of equality parts accurately represents a sort order based on the ordering information. A similar process is then performed for the remaining characters classes to allocate equality portions.

In the embodiment shown in FIG. 7, non-alphanumeric characters have been assigned equality portions beginning with 0000 and 0001. Such a determination was based on the ordering information for this character set. In other character sets, non-alphabetic characters may be sorted after alphanumeric characters. Similarly, in this embodiment, numbers have been assigned equality portions such that numbers will have a higher sort priority than letters; however, in other embodiments, other orderings may be used.

After assigning the equality parts, the processor 330 assigns differentiator parts to each character, though in some embodiments, the differentiator parts are allocated before the equality parts. Similar to the process for allocating equality parts, the processor 330 employs frequency information. However, additional characteristic information may be employed as well, including case information and diacritic information. In the embodiment shown in FIG. 7, each character class corresponding to a letter has characteristic information indicating that it has both upper and lower case characters. Because all letter character classes in this embodiment have upper and lower case characters, each differentiator part for the letter character classes begins with a fixed 1-bit bit field. In this embodiment, the non-alphabetic characters do not have similar characteristic information and so a 0-bit bit field may be used to gain efficiencies.

Because each alphabetic character class may comprise additional characteristic information besides case information, the processor 330 may allocate the value of the fixed 1-bit bit field based on frequency information. Thus, in the embodiment shown in FIG. 7, the character class 'A' has multiple members that may require additional bits to fully represent; however, because the character "a" has the greatest frequency value, it is allocated the value 0 with no additional bit information. The character "A" then is allocated the value 1 as well as 2-bit sub-field with a value of 00. In this embodiment, the remaining character classes are allocated bit fields according to frequency as well, with the least frequent character within a particular bit field having an additional sub-field, as necessary, to accommodate additional characters.

For example, four accented characters are allocated to a 2-bit sub-field based on their relative frequency values. The character of these four with the lowest frequency then has an additional bit field appended to its representation to accommodate additional members of the character set. As can be seen, the remaining 7 characters of character class 'A' have similar frequency values and were allocated to a 4-bit sub-field; however in some embodiments, different sized sub fields may be employed. After these 7 characters have been allocated values, no characters remain, and thus the last character within this sub-field does not have a further sub-field for additional characters.

Use of such variable sub-fields can save significant resources. In the embodiment shown in FIG. 7, the character class A has 14 members. Thus, in an embodiment using fixed-length bit fields, a 4-bit bit field would be needed to represent all members of character class A. However, because the character "a" appears so frequently, the additional three bits used in the fixed-length format may occupy much more space wasted, than the occasional use of the 8-bit representation of "Ä" in the variable-length embodiment shown in FIG. 7. But if relative frequencies of characters are similar, a fixed-width bit field may be more appropriate.

Also note that because the allocation of equality and differentiator parts may be heavily influenced by frequency values in some embodiments, it may be advantageous to track actual frequency statistics for data used in particular environments. In such an embodiment, it may be possible to optimize a character set based on actual operating conditions rather than frequency statistics based on general usage. For example, a database may be analyzed periodically and the character set may be optimized to obtain storage efficiencies. For example, if the character 'A' has a greater frequency in a particular operating environment than the character 'a,' their respective positions in the character set may be exchanged, or some or all of the members of the character class 'A' may be re-ordered. After the first and second parts of each character in the second character set have been created, the method 600 proceeds to step 660.

In step 660, the second character set is stored. In one embodiment, the second character set may be stored in a database 350 or in memory 340, such as for rapid access by an operating system. In one embodiment, the second character set may be stored to a file on a disk or transmitted to a remote computer over a network 370.

Embodiments of the present invention can be implemented in digital electronic circuitry, or in computer hardware, firmware, software, or in combinations of these technologies. In one embodiment, a computer may comprise a processor or processors. The processor comprises a computer-readable medium, such as a random access memory (RAM) coupled with the processor. The processor executes computer-executable program instructions stored in memory, such as executing one or more computer programs for messaging. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise or be in communication with media, for example computer-readable media, which stores instructions that, when executed by the processor, cause the processor to perform the steps described herein as carried out or facilitated by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor and the processing described may be in one or more structures and may be dispersed through one or more structures. The processor may comprise a code for carrying out one or more of the methods (or parts of methods) described herein.

GENERAL

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

Use of the conjunction "or" herein is intended to encompass both inclusive and exclusive relationships, or either inclusive or exclusive relationships as context dictates.

APPENDIX A

```
// This code translates a text string encoded using the
// sample character set shown in FIG. 7 to a Unicode
// string.
// EP bits are read from the beginning of the string and
// the DP bits are read after the last bit of the EP
// section of the text string.
// The output function writes a new Unicode character to
// the translated string using a hexadecimal value.
DO WHILE NOT END_OF_STRING( )
  READ_EP_BITS (4)
    CASE(0)  OUTPUT(0x20)
    CASE(1)
      READ_EP_BITS(3)
        CASE(0)  OUTPUT(0x2C)   //  ,
        CASE(1)  OUTPUT(0x2E)   //  .
        CASE(2)  OUTPUT(0x3F)   //  ?
        CASE(3)  OUTPUT(0x27)   //  '
    CASE(4)
      READ_EP_BITS(2)
        CASE(0)  OUTPUT(0x2D)   //  -
        CASE(1)  OUTPUT(0x22)   //  "
        CASE(2)
          READ_EP_BITS(2)
            CASE(0)  OUTPUT(0x28)   //  (
            CASE(1)  OUTPUT(0x29)   //  )
            CASE(2)  OUTPUT(0x3A)   //  :
            CASE(3)  OUTPUT(0x3B)   //  ;
          ENDSWITCH
        CASE(3)
          READ_EP_BITS(1)
            CASE(0)
              READ_EP_BITS(3)
                CASE(0)  OUTPUT(0x21)   //  !
                CASE(1)  OUTPUT(0x40)   //  @
                CASE(2)  OUTPUT(0x25)   //  %
```

APPENDIX A-continued

```
                CASE(3)  OUTPUT(0x26)   //  &
                CASE(4)  OUTPUT(0x2A)   //  *
                CASE(5)  OUTPUT(0x2B)   //  +
                CASE(6)  OUTPUT(0x3D)   //  =
                CASE(7)  OUTPUT(0x23)   //  #
              ENDSWITCH
            CASE(1)
              READ_EP_BITS(5)
                CASE(0)   OUTPUT(0x2F)   //  /
                CASE(1)   OUTPUT(0x24)   //  $
                CASE(2)   OUTPUT(0xA7)   //  §
                CASE(3)   OUTPUT(0xA3)   //  £
                CASE(4)   OUTPUT(0xA2)   //  ¢
                CASE(5)   OUTPUT(0x3C)   //  <
                CASE(6)   OUTPUT(0x5C)
                CASE(7)   OUTPUT(0x3E)   //  >
                CASE(8)   OUTPUT(0x5F)   //  _
                CASE(9)   OUTPUT(0x5B)   //  [
                CASE(10)  OUTPUT(0x5D)   //  ]
                CASE(11)  OUTPUT(0x7B)   //  {
                CASE(12)  OUTPUT(0x7D)   //  }
                CASE(13)  OUTPUT(0x60)   //  `
                CASE(14)  OUTPUT(0x5E)   //  ^
                CASE(15)  OUTPUT(0x7C)   //  |
                CASE(16)  OUTPUT(0x7E)   //  ~
              ENDSWITCH
          ENDSWITCH
        ENDSWITCH
    CASE(5)  OUTPUT(0x30)   //  0
    CASE(6)
      READ_EP_BITS(2)
        CASE(0)  OUTPUT(0xBC)   //  ¼
        CASE(1)  OUTPUT(0xBD)   //  ½
        CASE(2)  OUTPUT(0xBE)   //  ¾
      ENDSWITCH
    CASE(7)  OUTPUT(0x31)   //  1
  ENDSWITCH
CASE(2)
  READ_EP_BITS(3)
    CASE(0)  OUTPUT(0x32)   //  2
    CASE(1)  OUTPUT(0x33)   //  3
    CASE(2)  OUTPUT(0x34)   //  4
    CASE(3)  OUTPUT(0x35)   //  5
    CASE(4)  OUTPUT(0x36)   //  6
    CASE(5)  OUTPUT(0x37)   //  7
    CASE(6)  OUTPUT(0x38)   //  8
    CASE(7)  OUTPUT(0x39)   //  9
  ENDSWITCH
CASE(3)
  READ_DP_BITS(1)
    CASE(0)  OUTPUT(0x61)   //  a
    CASE(1)
      READ_DP_BITS(1)
        CASE(0)  OUTPUT(0x41)   //  A
        CASE(1)
          READ_DP_BITS(2)
            CASE(0)  OUTPUT(0xE0)   //  à
            CASE(1)  OUTPUT(0xC0)   //  À
            CASE(2)  OUTPUT(0xE1)   //  á
            CASE(3)
              READ_DP_BITS(4)
                CASE(0)  OUTPUT(0xC1)   //  Á
                CASE(1)  OUTPUT(0xE4)   //  ä
                CASE(2)  OUTPUT(0xC4)   //  Ä
                CASE(3)  OUTPUT(0xE5)   //  å
                CASE(4)  OUTPUT(0xC5)   //  Å
                CASE(5)  OUTPUT(0xE2)   //  â
                CASE(6)  OUTPUT(0xC2)   //  Â
                CASE(7)  OUTPUT(0xE3)   //  ã
                CASE(8)  OUTPUT(0xC3)   //  Ã
              ENDSWITCH
          ENDSWITCH
      ENDSWITCH
  ENDSWITCH
CASE(4)
  READ_EP_BITS(1)
    CASE(0)
      READ_EP_BITS(1)
        CASE(0)
          READ_DP_BITS(1)
```

APPENDIX A-continued

```
          CASE(0)  OUTPUT(0x62)  // b
          CASE(1)
            READ_DP_BITS(1)
              CASE(0)  OUTPUT(0x42)  // B
            ENDSWITCH
        ENDSWITCH
        CASE(1)
          READ_DP_BITS(1)
            CASE(0)  OUTPUT(0x63)  // c
            CASE(1)  OUTPUT(0x43)  // C
          ENDSWITCH
      ENDSWITCH
      CASE(1)
        READ_DP_BITS(1)
          CASE(0)  OUTPUT(0x64)  // d
          CASE(1)  OUTPUT(0x44)  // D
        ENDSWITCH
    ENDSWITCH
  CASE(5)
    READ_DP_BITS(1)
      CASE(0)  OUTPUT(0x65)  // e
      CASE(1)
        READ_DP_BITS(1)
          CASE(0)  OUTPUT(0x45)  // E
          CASE(1)
            READ_DP_BITS(2)
              CASE(0)  OUTPUT(0xE9)  // é
              CASE(1)  OUTPUT(0xC9)  // É
              CASE(2)  OUTPUT(0xE8)  // è
              CASE(3)
                READ_DP_BITS(3)
                  CASE(0)  OUTPUT(0xC8)  // È
                  CASE(1)  OUTPUT(0xEA)  // ê
                  CASE(2)  OUTPUT(0xCA)  // Ê
                  CASE(3)  OUTPUT(0xEB)  // ë
                  CASE(4)  OUTPUT(0xCB)  // Ë
                ENDSWITCH
            ENDSWITCH
        ENDSWITCH
    ENDSWITCH
  CASE(6)
    READ_EP_BITS(1)
      CASE(0)
        READ_DP_BITS(1)
          CASE(0)  OUTPUT(0x66)  // f
          CASE(1)  OUTPUT(0x46)  // F
        ENDSWITCH
      CASE(1)
        READ_EP_BITS(1)
          CASE(0)
            READ_DP_BITS(1)
              CASE(0)  OUTPUT(0x67)  // g
              CASE(1)  OUTPUT(0x47)  // G
            ENDSWITCH
          CASE(1)
            READ_DP_BITS(1)
              CASE(0)  OUTPUT(0x68)  // h
              CASE(1)  OUTPUT(0x48)  // H
            ENDSWITCH
        ENDSWITCH
    ENDSWITCH
  CASE(7)
    READ_DP_BITS(1)
      CASE(0)  OUTPUT(0x69)  // i
      CASE(1)
        READ_DP_BITS(1)
          CASE(0)  OUTPUT(0x49)  // I
          CASE(1)
            READ_DP_BITS(1)
              CASE(0)  OUTPUT(0xCC)  // Ì
              CASE(1)  OUTPUT(0xCD)  // Í
            ENDSWITCH
        ENDSWITCH
    ENDSWITCH
  CASE(8)
    READ_EP_BITS(1)
      CASE(0)
        READ_EP_BITS(1)
          CASE(0)
            READ_DP_BITS(1)
              CASE(0)  OUTPUT(0x6A)  // j
              CASE(1)  OUTPUT(0x4A)  // J
            ENDSWITCH
          CASE(1)
            READ_DP_BITS(1)
              CASE(0)  OUTPUT(0x6B)  // k
              CASE(1)  OUTPUT(0x4B)  // K
            ENDSWITCH
        ENDSWITCH
      CASE(1)
        READ_DP_BITS(1)
          CASE(0)  OUTPUT(0x6C)  // l
          CASE(1)  OUTPUT(0x4C)  // L
        ENDSWITCH
    ENDSWITCH
  CASE(9)
    READ_DP_BITS(1)
      CASE(0)  OUTPUT(0x6D)  // m
      CASE(1)  OUTPUT(0x4D)  // M
    ENDSWITCH
  CASE(10)
    READ_DP_BITS(1)
      CASE(0)  OUTPUT(0x6E)  // n
      CASE(1)  OUTPUT(0x4E)  // N
    ENDSWITCH
  CASE(11)
    READ_EP_BITS(1)
      CASE(0)
        READ_DP_BITS(1)
          CASE(0)  OUTPUT(0x6F)  // o
          CASE(1)
            READ_DP_BITS(1)
              CASE(0)  OUTPUT(0x4F)  // O
              CASE(1)
                READ_DP_BITS(1)
                  CASE(0)  OUTPUT(0x153)  // œ
                  CASE(1)  OUTPUT(0x152)  // Œ
                ENDSWITCH
            ENDSWITCH
        ENDSWITCH
      CASE(1)
        READ_EP_BITS(1)
          CASE(0)
            READ_DP_BITS(1)
              CASE(0)  OUTPUT(0x70)  // p
              CASE(1)  OUTPUT(0x50)  // P
            ENDSWITCH
          CASE(1)
            READ_DP_BITS(1)
              CASE(0)  OUTPUT(0x71)  // q
              CASE(1)  OUTPUT(0x51)  // Q
            ENDSWITCH
        ENDSWITCH
    ENDSWITCH
  CASE(12)
    READ_EP_BITS(1)
      CASE(0)
        READ_DP_BITS(1)
          CASE(0)  OUTPUT(0x72)  // r
          CASE(1)  OUTPUT(0x52)  // R
        ENDSWITCH
      CASE(1)
        READ_DP_BITS(1)
          CASE(0)  OUTPUT(0x73)  // s
          CASE(1)
            READ_DP_BITS(1)
              CASE(0)  OUTPUT(0x53)  // S
              CASE(1)
                READ_DP_BITS(1)
                  CASE(0)  OUTPUT(0x160)  // Š
                ENDSWITCH
            ENDSWITCH
        ENDSWITCH
    ENDSWITCH
  CASE(13)
    READ_DP_BITS(1)
      CASE(0)  OUTPUT(0x74)  // t
      CASE(1)
        READ_DP_BITS(1)
          CASE(0)  OUTPUT(0x54)  // T
```

APPENDIX A-continued

```
        ENDSWITCH
       ENDSWITCH
    CASE(14)
      READ_EP_BITS(2)
        CASE(0)
          READ_DP_BITS(1)
            CASE(0)  OUTPUT(0x75)   // u
            CASE(1)
              READ_DP_BITS(1)
                CASE(0)  OUTPUT(0x55)   // U
              ENDSWITCH
          ENDSWITCH
        CASE(1)
          READ_DP_BITS(1)
            CASE(0)  OUTPUT(0x76)   // v
            CASE(1)
              READ_DP_BITS(2)
                CASE(0)  OUTPUT(0x56)   // V
                CASE(1)  OUTPUT(0x77)   // w
                CASE(2)  OUTPUT(0x57)   // W
              ENDSWITCH
          ENDSWITCH
        CASE(2)
          READ_EP_BITS(2)
            CASE(0)
              READ_DP_BITS(1)
                CASE(0)  OUTPUT(0x78)   // x
                CASE(1)
                  READ_DP_BITS(1)
                    CASE(0)  OUTPUT(0x58)   // X
                  ENDSWITCH
              ENDSWITCH
            CASE(1)
              READ_DP_BITS(1)
                CASE(0)  OUTPUT(0x79)   // y
                CASE(1)
                  READ_DP_BITS(1)
                    CASE(0)  OUTPUT(0x59)   // Y
                  ENDSWITCH
              ENDSWITCH
            CASE(2)
              READ_DP_BITS(1)
                CASE(0)  OUTPUT(0x7A)   // z
                CASE(1)
                  READ_DP_BITS(1)
                    CASE(0)  OUTPUT(0x5A)   // Z
                    CASE(1)
                      READ_DP_BITS(1)
                        CASE(0)  OUTPUT(0x17D)   // Ž
                      ENDSWITCH
                  ENDSWITCH
              ENDSWITCH
            CASE(3)
              READ_EP_BITS(1)
                CASE(0)  OUTPUT(  CEG(  16  )  )
                CASE(1)  OUTPUT(  0xFFFF  );
              ENDSWITCH
          ENDSWITCH
      ENDSWITCH
    ENDSWITCH
  END WHILE
```

That which is claimed is:

1. A non-transitory computer-readable medium comprising program code for causing a processor to execute a method, program code comprising:
   program code for receiving a plurality of text strings, each text string comprising at least one character, wherein each character of each text string is represented within the respective text string according to a representation format comprising:
      an equality part and a differentiator part,
      wherein the equality part indicates a membership within a class of characters and a sort priority of the class of characters, and the differentiator part represents a particular character of the class of characters indicated by the equality part,
      said representation format comprising a variable number of bits per character wherein a combination of the equality part and the differentiator part provides a complete representation of the string;
   program code for receiving a request to sort the plurality of text strings;
   program code for sorting the plurality of text strings based on the equality parts of the at least one characters of the plurality of text strings; and
   program code for displaying any of the plurality of text strings by generating a displayable representation of the respective text string from the combination of the equality parts and the differentiator parts.

2. The non-transitory computer-readable medium of claim 1, wherein the equality part is based at least in part on ordering information and the differentiator part is based at least in part on characteristic information.

3. The non-transitory computer-readable medium of claim 2, wherein the characteristic information comprises case information or diacritical information.

4. The non-transitory computer-readable medium of claim 1, wherein the equality part and the differentiator part each have a fixed length.

5. The non-transitory computer-readable medium of claim 1, wherein the equality part and the differentiator part each have a variable length.

6. The non-transitory computer-readable medium of claim 1, wherein one of the equality part or the differentiator part has a fixed length and the other has a variable length.

7. The non-transitory computer-readable medium of claim 1, wherein the program code for sorting the plurality of text strings comprises program code for storing equality parts of a plurality of characters of a first text string of the plurality of text strings in a first register and equality parts of a plurality of characters of a second text string of the plurality of text strings in a second register and program code for comparing the first register with the second register.

8. The non-transitory computer-readable medium of claim 7, wherein the first register and the second register are CPU registers.

9. The non-transitory computer-readable medium of claim 1, wherein one of the equality part or the differentiator part has a fixed length and the other has a variable length.

10. The non-transitory computer-readable medium of claim 1, wherein at least one of said plurality of text strings comprises a string format having an equality string part and a differentiator string part, the first string part comprising the equality parts of each of the characters of the string, and the differentiator string part comprising the differentiator parts of each of the characters of the string, wherein the equality string part comprises a contiguous block of memory storing the equality parts of each of the characters of the string, and wherein the differentiator string part comprises a contiguous block of memory storing the differentiator parts of each of the characters of the string.

11. The non-transitory computer-readable medium of claim 10, wherein the representation format further comprises a string length part and a separator position part, the string length part configured to indicate the length of a text string, the separator position part configured to indicate the position of either the differentiator string part or the equality string part.

12. A non-transitory computer-readable medium comprising program code for causing a processor to execute a method, program code comprising:

program code for receiving a first text string comprising characters represented in the first text string according to a first representation format;

program code for generating a second text string comprising characters represented in the first text string according to a second representation format comprising an equality part and a differentiator part, wherein the equality part indicates a membership within a class of characters and a sort priority of the class of characters, and the differentiator part represents a particular character of the class of characters indicated by the equality part, and wherein a combination of the equality part and the differentiator part provides a complete representation of the string, said second representation format comprising a variable number of bits per character;

program code for storing the second text string in a database;

program code for receiving a request for the first text string;

program code for retrieving the second text string from the database in response to the request;

program code for displaying the second text string by generating a displayable representation of the second text string from the combination of the equality part and the differentiator part;

program code for generating the first text string from the second text string based at least in part on the equality parts and the differentiator parts of the characters in the second text string; and program code for outputting the first text string.

13. The non-transitory computer-readable medium of claim 12, wherein the equality part is based at least in part on ordering information and the differentiator part is based at least in part on characteristic information.

14. The non-transitory computer-readable medium of claim 13, wherein the characteristic information comprises case information or diacritical information.

15. The non-transitory computer-readable medium of claim 12, wherein the equality part and the differentiator part each have a variable length.

16. The non-transitory computer-readable medium of claim 12, further comprising program code for sorting a plurality of records in the database each having a text string according to the second representation format, wherein a sort order is based on the equality part of the text strings of the plurality of records.

17. The non-transitory computer-readable medium of claim 16, wherein the equality parts of a plurality of the characters of the second text string are stored in a first register and wherein equality parts of a plurality of the characters of a third text string are stored in a second register, and wherein sorting a plurality of records comprises comparing the value of the first register against the value of the second register.

18. The non-transitory computer-readable medium of claim 17, wherein the first register and the second register are CPU registers.

19. The non-transitory computer-readable medium of claim 12, wherein said second text string comprises a string format having an equality string part and a second string part, the equality string part comprising the equality parts of each of the characters of the string, and the second string part comprising the second parts of each of the characters of the string, wherein the equality string part comprises a contiguous block of memory storing the equality parts of each of the characters of the string, and wherein the differentiator string part comprises a contiguous block of memory storing the differentiator parts of each of the characters of the string.

20. The non-transitory computer-readable medium of claim 19, wherein the second representation format further comprises a string length part and a separator position part, the string length part configured to indicate the length of a text string, the separator position part configured to indicate the position of either the differentiator string part or the equality string part.

21. A non-transitory computer-readable medium comprising program code for causing a processor to execute a method, program code comprising:

program code for receiving a first character set having a plurality of characters represented according to a first representation format;

program code for receiving an ordering of the plurality of characters;

program code for receiving characteristic information describing characteristics of characters or classes of characters;

program code for determining a second representation for each of the plurality of characters, each second representation according to a second representation format having an equality part and a differentiator part, wherein the equality part indicates a membership within a class of characters and a sort priority of the class of characters, and the differentiator part represents a particular character of the class of characters indicated by the equality part, and wherein a combination of the equality part and the differentiator part provides a complete representation of the string, the second representations of the plurality of characters based on the ordering and the characteristic information, and comprising a variable number of bits per character;

program code for generating a second character set according to the second representation format based at least in part on the second representations of the plurality of characters, wherein the second character set is configured to allow sorting of text strings generated from the second character set, the sorting based on the equality parts of characters of the text strings; and program code for displaying a text string of the second representation format by generating displayable representations of a respective text string from the combination of the equality part and the differentiator part.

22. The non-transitory computer-readable medium of claim 21, wherein the equality part is based at least in part on the ordering information and the differentiator part is based at least in part on the characteristic information.

23. The non-transitory computer-readable medium of claim 21, wherein the equality part and the differentiator part each have a fixed length.

24. The non-transitory computer-readable medium of claim 21, wherein the equality part and the differentiator part each have a variable length.

25. The non-transitory computer-readable medium of claim 21, wherein one of the equality part or the differentiator part has a fixed length and the other has a variable length.

26. The non-transitory computer-readable medium of claim 21, wherein the characteristic information comprises case information or diacritical information.

27. The non-transitory computer-readable medium of claim 21, further comprising program code for receiving frequency information, and wherein the generating a second character set is further based at least in part on the frequency information.

28. The non-transitory computer-readable medium of claim 21, wherein said second text string comprises a string format having an equality string part and a second string part, the first string part comprising the equality parts of each of the characters of the string, and the second string part comprising the second parts of each of the characters of the string, wherein the equality string part comprises a contiguous block of memory storing the equality parts of each of the characters of the string, and wherein the differentiator string part comprises a contiguous block of memory storing the differentiator parts of each of the characters of the string.

29. The method of claim 28, wherein the second representation format further comprises a string length part and a separator position part, the string length part configured to indicate the length of a text string, the separator position part configured to indicate the position of either the differentiator string part or the equality string part.

30. A method comprising:
receiving a plurality of text strings, each text string comprising at least one character, wherein each character of each text string is represented in the respective text string according to a representation format comprising an equality part and a differentiator part,
wherein the equality part indicates a membership within a class of characters and a sort priority of the class of characters, and the differentiator part represents a particular character of the class of characters indicated by the equality part, and
wherein a combination of the equality part and the differentiator part provides a complete representation of the string said representation format comprising a variable number of bits per character;
receiving a request to sort the plurality of text strings; and
sorting the plurality of text strings based on the equality parts of the at least one characters of the plurality of text strings; and
displaying any of the plurality of text strings by generating a displayable representation of the respective text string from the combination of the equality part and the differentiator part.

31. The method of claim 30, wherein at least one of said plurality of text strings comprises a string format having an equality string part and a second string part, the equality string part comprising the equality parts of each of the characters of the string, and the second string part comprising the second parts of each of the characters of the string, wherein the equality string part comprises a contiguous block of memory storing the equality parts of each of the characters of the string, and wherein the differentiator string part comprises a contiguous block of memory storing the differentiator parts of each of the characters of the string.

32. The method of claim 31, wherein the representation format further comprises a string length part and a separator position part, the string length part configured to indicate the length of a text string, the separator position part configured to indicate the position of either the differentiator string part or the equality string part.

33. A method comprising:
receiving a first text string comprising characters represented in the first text string according to a first representation format;
generating a second text string comprising characters represented in the first text string according to a second representation format comprising a equality part and a differentiator part,
wherein the equality part indicates a membership within a class of characters and a sort priority of the class of characters, and the differentiator part represents a particular character of the class of characters indicated by the equality part, and
wherein a combination of the equality part and the differentiator part provides a complete representation of the string said second representation format comprising a variable number of bits per character;
storing the second text string in a database;
receiving a request for the first text string;
retrieving the second text string from the database in response to the request;
generating the first text string from the second text string based at least in part on the equality parts and the differentiator parts of the characters in the second text string;
displaying the second text string by generating displayable representations of the second text string from the combination of the equality part and the differentiator part; and
outputting the first text string.

34. The method of claim 33, wherein said second text string comprises a string format having an equality string part and a second string part, the equality string part comprising the equality parts of each of the characters of the string, and the second string part comprising the second parts of each of the characters of the string, wherein the equality string part comprises a contiguous block of memory storing the equality parts of each of the characters of the string, and wherein the differentiator string part comprises a contiguous block of memory storing the differentiator parts of each of the characters of the string.

35. The method of claim 34, wherein the second representation format further comprises a string length part and a separator position part, the string length part configured to indicate the length of a text string, the separator position part configured to indicate the position of either the differentiator string part or the equality string part.

36. A method, comprising:
receiving a first character set having a plurality of characters represented according to a first representation format;
receiving an ordering of the plurality of characters;
receiving characteristic information describing characteristics of characters or classes of characters;
determining a second representation for each of the plurality of characters, each second representation according to a second representation format having an equality part and a differentiator part,
wherein the equality part indicates a membership within a class of characters and a sort priority of the class of characters, and the differentiator part represents a particular character of the class of characters indicated by the equality part, and
wherein a combination of the equality part and the differentiator part provides a complete representation of the string, the second representations of the plurality of characters based on the ordering and the characteristic information, and comprising a variable number of bits per character;
generating a second character set according to the second representation format based at least in part on the second representations of the plurality of characters, wherein the second character set is configured to allow sorting of text strings generated from the second character set, the sorting based on the equality parts of characters of the text strings; and displaying a text string of the second representation format by generating displayable representations of a respective text string from the combination of the equality part and the differentiator part.

37. The method of claim 36, wherein said second text string comprises a string format having a first string part and a second string part, the first string part comprising the first parts of each of the characters of the string, and the second string part comprising the second parts of each of the characters of the string, wherein the equality string part comprises a contiguous block of memory storing the equality parts of each of the characters of the string, and wherein the differentiator string part comprises a contiguous block of memory storing the differentiator parts of each of the characters of the string.

38. The method of claim 37, wherein the second representation format further comprises a string length part and a separator position part, the string length part configured to indicate the length of a text string, the separator position part configured to indicate the position of either the differentiator string part or the equality string part.

\* \* \* \* \*